US012794922B2

(12) United States Patent
Smolik et al.

(10) Patent No.: US 12,794,922 B2
(45) Date of Patent: Nov. 10, 2026

(54) METHOD AND SYSTEM FOR MONITORING TRAFFIC IN AN INDUSTRIAL COMPUTER NETWORK

(71) Applicant: ICSEC S.A., Poznan (PL)

(72) Inventors: Marek Smolik, Zakret (PL); Robert Bielicki, Warsaw (PL)

(73) Assignee: ICSEC S.A., Poznan (PL)

( * ) Notice: Subject to any disclaimer, the term of this patent is extended or adjusted under 35 U.S.C. 154(b) by 37 days.

(21) Appl. No.: 18/945,880

(22) Filed: Nov. 13, 2024

(65) Prior Publication Data

US 2025/0159009 A1 May 15, 2025

Related U.S. Application Data

(63) Continuation-in-part of application No. 18/389,237, filed on Nov. 14, 2023, now abandoned.

(30) Foreign Application Priority Data

Nov. 13, 2023 (EP) .................................... 23209511

(51) Int. Cl.
*H04L 9/40* (2022.01)
*G06N 20/20* (2019.01)

(52) U.S. Cl.
CPC ......... *H04L 63/1425* (2013.01); *G06N 20/20* (2019.01)

(58) Field of Classification Search
CPC ..... H04L 63/1425; G06N 20/20; G06N 20/00
See application file for complete search history.

(56) References Cited

U.S. PATENT DOCUMENTS

2005/0131848 A1* 6/2005 Chickering ............ G06N 20/00 706/12
2005/0182841 A1* 8/2005 Sharp ...................... H04L 69/16 709/228
(Continued)

OTHER PUBLICATIONS

Osa et al., "Comparative Analysis of Machine Learning Models in Computer Network Intrusion Detection", Apr. 2022, IEEE Nigeria 4th International Conference on Disruptive Technologies for Sustainable Development, pp. 1-5 (Year: 2022).*
(Continued)

*Primary Examiner* — Kenneth W Chang
(74) *Attorney, Agent, or Firm* — Rivka Friedman

(57) ABSTRACT

A method for monitoring network traffic. The method includes: receiving network traffic packets from at least one network probe; pre-processing network traffic packets to generate pre-processed network traffic data containing at least one statistical value for at least one parameter for a plurality of packets; each network traffic data item of the time series being representative of network traffic packets from a selected time window; providing a plurality of machine learning models configured to predict network traffic data for upcoming traffic based on the pre-processed network traffic data of traffic received so far; training the machine learning models with the pre-processed network traffic data and deriving an evaluation score for each machine learning model; and based on the evaluation score, selecting at least one model of the trained machine learning models for monitoring of upcoming network traffic; monitoring the upcoming network traffic to detect anomalous events; and generating a warning.

12 Claims, 6 Drawing Sheets

(56) References Cited

U.S. PATENT DOCUMENTS

| | | | | |
|---|---|---|---|---|
| 2005/0188241 | A1* | 8/2005 | Cabezas | H04L 61/5046<br>714/4.2 |
| 2009/0326899 | A1* | 12/2009 | Ghorbani | H04L 63/1433<br>726/25 |
| 2011/0307936 | A1* | 12/2011 | Braendle | H04L 63/20<br>709/224 |
| 2015/0113190 | A1* | 4/2015 | Wohlgemuth | H04L 69/22<br>710/200 |
| 2015/0128263 | A1* | 5/2015 | Raugas | G06F 21/552<br>726/23 |
| 2016/0105462 | A1* | 4/2016 | Duffield | G06F 21/552<br>726/1 |
| 2017/0279828 | A1* | 9/2017 | Savalle | H04L 63/1458 |
| 2020/0097810 | A1 | 3/2020 | Hetherington et al. | |
| 2020/0364561 | A1 | 11/2020 | Ananthanarayanan | |
| 2021/0067548 | A1* | 3/2021 | Brandt | G06N 20/00 |

OTHER PUBLICATIONS

European Search Report for EP23209511 Mailed on Mar. 6, 2024.

* cited by examiner

501

| | $x_1$ | $x_2$ | ... | $x_n$ | $y$ |
|---|---|---|---|---|---|
| 1 | $t_1$ | $t_2$ | | $t_n$ | $t_{n+1}$ |
| 2 | $t_2$ | $t_3$ | | $t_{n+1}$ | $t_{n+2}$ |
| 3 | $t_3$ | $t_4$ | | $t_{n+2}$ | $t_{n+3}$ |
| ... | | | | | |
| m | $t_{N-n}$ | $t_{N-n+1}$ | | $t_{N-1}$ | $t_N$ |

Fig. 5

METHOD AND SYSTEM FOR MONITORING TRAFFIC IN AN INDUSTRIAL COMPUTER NETWORK

TECHNICAL FIELD

The present invention relates to monitoring traffic in an industrial computer network.

BACKGROUND

Industrial computer networks are extensively utilized in manufacturing, energy, and transportation sectors to facilitate communication and data exchange between various devices and systems. These networks are crucial in ensuring the seamless operation of industrial processes and efficient resource management.

Monitoring the network traffic within industrial networks is vital for maintaining the network's integrity, availability, and security. By analyzing the traffic between devices, it is possible to identify communication patterns and detect any anomalies or deviations from normal behavior. Such anomalies could indicate device malfunctions, network failures, or potential security breaches.

In the past, various methods and systems have been developed for monitoring network traffic in industrial networks. These include network monitoring tools that capture and analyze network packets, intrusion detection systems that detect and prevent unauthorized access, and anomaly detection systems that identify abnormal network behavior.

However, these existing solutions have limitations. They often require complex configurations, extensive manual intervention, and a deep understanding of the network infrastructure. Additionally, they can not effectively handle the unique characteristics and requirements of industrial networks, such as the large number of devices, diverse communication protocols, and the real-time nature of industrial processes.

The prior art approach of applying a specific machine learning module provides versatility of use of the monitoring system, but can not be a universal approach that is applicable to a wide range of various industrial computer networks.

SUMMARY

There is a need to provide a method and system for monitoring traffic in an industrial computer network that will be versatile in use and applicable to many different types of computer networks, wherein various types of devices can operate.

The object of the invention is a computer-implemented method for monitoring network traffic, the method comprising: receiving network traffic packets from at least one network probe; pre-processing network traffic packets to generate pre-processed network traffic data in a form of a time series containing at least one statistical value for at least one parameter for a plurality of packets, each network traffic data item of the time series being representative of network traffic packets from a selected time window; providing a plurality of machine learning models configured to predict network traffic data for upcoming traffic based on the pre-processed network traffic data of traffic received so far, wherein each machine learning model is dedicated to a distinct statistical value for a distinct parameter; training the machine learning models with the pre-processed network traffic data and deriving an evaluation score for each machine learning model; and based on the evaluation score, selecting at least one machine learning model of the trained machine learning models for monitoring of upcoming network traffic; monitoring the upcoming network traffic to detect anomalous events by comparing the actual network state with a network state simulation generated using the selected at least one machine learning model; and generating a warning if the actual network state does not match the generated network state simulation, wherein the network state is represented by a statistical value for a parameter specific to the selected model.

The method may comprise pre-processing the network traffic packets individually for each connection, wherein a connection is identified by at least one of: a sender identifier, a recipient identifier, a communication port and a transmission protocol.

The pre-processing may comprise determining, for each packet, at least one parameter corresponding to a time until arrival of a next packet, a payload length or an entropy, and determining, for each parameter of a plurality of packets, at least one statistical value corresponding to a minimal value, a maximal value, a mean value, a standard deviation value or a sum value, to obtain at least one statistical value for at least one parameter for a plurality of packets.

The method may further comprise outputting the warning signal via a graphical user interface or an application program interface.

The method may further comprise determining an optimal time window length from a plurality of time window lengths within predefined limits.

The method may further comprise determining whether the statistical values have a standard distribution and if so, selecting at least one statistical machine learning model, and otherwise selecting at least one autoregressive machine learning model for training.

The method may further comprise including a number of packets within a time window in the pre-processed network traffic data.

At least one parameter for a plurality of packets can be a time until arrival of the next packet, a length of a payload carried by a packet, an entropy of the payload or a hash function of the payload.

The invention also relates to a network monitoring system comprising: a data interface for receiving network traffic packets from at least one network probe; a data pre-processor for pre-processing network traffic packets to generate pre-processed network traffic data in a form of a time series containing statistics for the network traffic packets, each network traffic data item of the time series being representative of network traffic packets from a selected time window; a configurator comprising a plurality of machine learning models configured to predict network traffic data for upcoming traffic based on the pre-processed network traffic data of traffic received so far, wherein each machine learning model is dedicated to a distinct statistical value for a distinct parameter, and a controller configured to: train the machine learning models with the pre-processed network traffic data; derive an evaluation score for each machine learning model; and based on the evaluation score, select at least one machine learning model of the trained machine learning models for monitoring of upcoming network traffic; and an anomalies detector configured to: monitor the upcoming network traffic to detect anomalous events by comparing the actual network state with a network state simulation generated using the selected at least one machine learning model and generate a warning if the actual network state does not match the generated network state simulation, wherein the network state is represented by a statistical value for a parameter specific to the selected model.

The system may be specifically configured to perform any of the steps of the method as described herein.

BRIEF DESCRIPTION OF DRAWINGS

Various embodiments are herein described, by way of example only, with reference to the accompanying drawings, wherein:

FIG. 5 presents a table of input data and predicted values;

DETAILED DESCRIPTION

The following detailed description is of the best currently contemplated modes of carrying out the invention. The description is not to be taken in a limiting sense, but is made merely for the purpose of illustrating the general principles of the invention.

The present invention is applicable to industrial network monitoring systems that operate based on the analysis of communication between devices. The system monitors transfer of data (network packets) to detect anomalous events in network traffic. The solution is based on the idea of comparing the actual network state with a simulation generated using a defined set of generic machine learning models. If the actual state does not match the simulation, the system responds by generating a warning.

Figure 1:
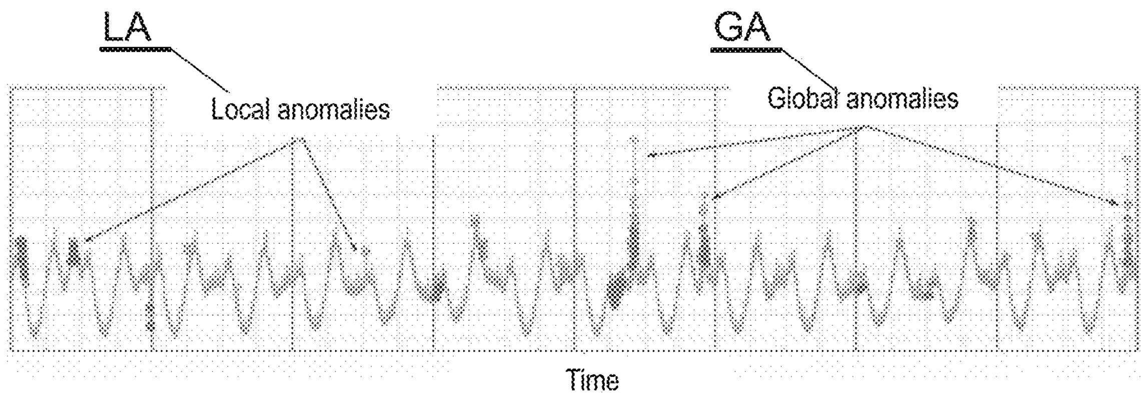
FIG. 1 illustrates two types of anomalies in a time series forecast.

FIG. 1 illustrates two types of anomalies in a time series forecast: global anomalies and local anomalies LA. Local anomalies refer to the detection of a single (and usually small) difference between predicted and actual values. Such anomalies are highly dependent on the accuracy of the prediction and the sensitivity of the machine learning model (which is defined as the possible range around a forecast that is still accepted as normal and not treated not as an anomaly). Moreover, local anomalies are more likely to be false positives than global ones. Global anomalies GA occur when a significant change in system behavior is noticed. This can indicate a real threat or that the system has been compromised. However, persistent global anomalies occur when the machine learning model is not trained well enough or some of the major new features of the network's behavior have begun to appear. Said machine learning models are generated (defined) through a learning process that uses a template data set representing a reference network traffic.

System Structure

Figure 2:
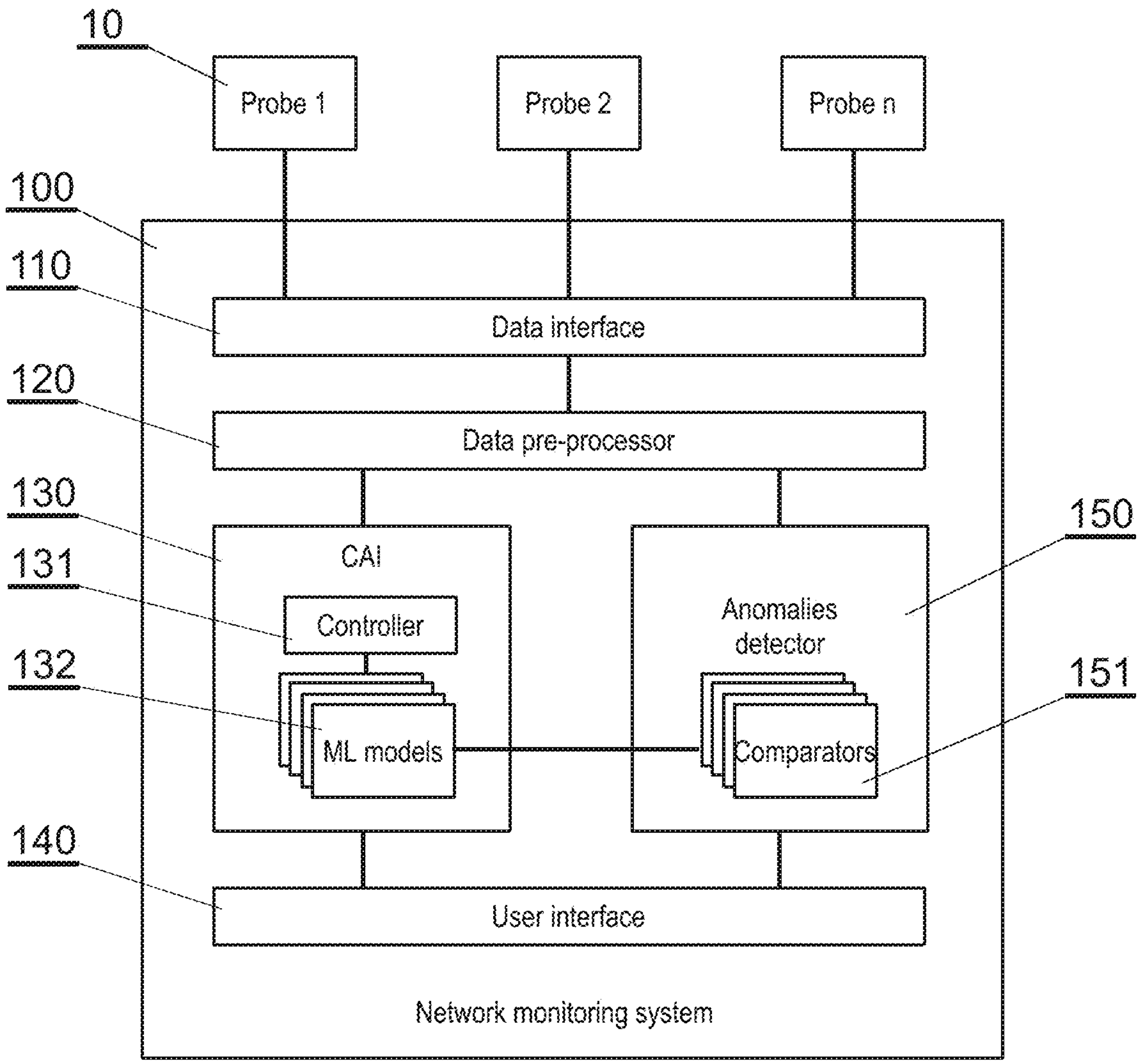
FIG. 2 shows an overview of the system for monitoring network traffic.

FIG. 2 illustrates an overview of the system for monitoring network traffic. The system 100 comprises a data interface 110 for receiving, in step 710, network traffic packets from at least one network probe 10. The network probes can be installed in specific network areas where traffic monitoring is required.

A data pre-processor 120 is configured to pre-process, in step 720, the network traffic packets by clustering packets (step 726) to generate network traffic data in a form of a time series containing statistics for the network traffic packets. For example, the time series may have a form such as shown in FIG. 1, indicating payload of packets in consecutive time windows.

A configurator of artificial intelligence, CAI, 130 comprises a plurality of machine learning models 132, which are provided in step 730, configured to predict network traffic data for upcoming traffic based on the pre-processed network traffic data of traffic received so far and a controller 131 configured to train, in step 740, the machine learning models 132 and to derive evaluation for each machine learning model 132. The machine learning models 132 used in the system can be supervised learning models and/or unsupervised learning models. Information on the best performing machine learning model 132 can be stored in a database 133 (along with information on the network traffic data for which the particular model was particularly effective) and used to select, in step 750, at least one model for actual monitoring of the upcoming network traffic during operation of the system. The CAI configurator can therefore operate (distinctly or in simultaneously) in two modes, a training mode wherein the machine learning models 132 are trained and selected, and in a prediction mode wherein the outputs of the selected machine learning models 132 are provided for use in detecting anomalies.

The controller 131 can operate in the training mode continuously, in parallel with a prediction mode, in order to continuously monitor which machine learning model 132 is the most effective for the current traffic. Alternatively, the controller 131 can operate in the training mode periodically (for example, once per hour or once per day) and/or on demand (for example, upon detecting a significant change in the characteristics of network traffic or upon changes to the network infrastructure such as when a new device or a new connection is installed within the network).

An anomalies detector 150 is configured to monitor, in step 760, the upcoming network traffic to detect anomalous events by comparing the actual network state with a network state simulation generated using the selected at least one machine learning model 132 and generating a warning if the actual network state does not match the generated network state simulation. The anomalies detector contains a plurality of comparators 151, each associated in a one-to-one or one-to-many relationship with the selected machine learning models 132. In other words, the output of each of the selected machine learning models 132, i.e. the network state simulation (in a form of a predicted statistical value for a parameter specific to that machine learning model) is input to one or more of the comparators 151. Each comparator 151 is configured to compare statistical value predicted by one or more machine learning models 132 with a statistical value generated for actual network traffic by the data pre-processor 120. In case there is an anomaly, the anomalies detector 150 generates a warning signal in step 770.

A user interface 140 is provided to allow the user to configure the operation of the network monitoring system and of the anomalies detector and view results of their operation, such as the selection of the machine learning models 132 made in the CAI module 130 or warning signals generated by the anomalies detector 150, in step 780. The user interface 140 may have a form of a graphical user interface (GUI) or an application program interface (API) via which data can be pushed or pulled for cooperation with other modules.

Packet Statistics

The network packets collected by the network probes 10 can be arranged according to a particular connection (step 721), wherein the packets corresponding to a particular connection are packets that have in common at least one of:

- sent by a particular sender device (identified by a sender id, such as an IP address)
- sent to a particular recipient device (identified by a recipient id, such as an IP address)
- corresponding to a particular communication port (such as a TCP/IP port)
- corresponding to a particular transmission protocol The system can monitor all individual connections or connections that have a minimum predetermined number of packets transmitted in total (such as at least 5000 packets). Therefore, for each connection an independent set of simulation models will be created. Consequently, once a connection has collected a sufficient number of packets, the CAI module 130 can proceed to the consecutive analysis steps (for a given connection) to analyze the collected set of packets.

For each connection to be analyzed, additional information on packets is collected, such as the arrival time of the first packet and the last packet in the set of packets.

In addition, for each packet $p_i$ of the connection the system can determine the following parameters (step 722):

- time until arrival of the next packet, i.e. the difference between arrival of packet $p_{i+1}$ and $p_i$, measured for example in microseconds;
- a length of a payload carried by that packet, measured for example by the number of hexadecimal characters transmitted;
- an entropy, in particular Shannon's entropy, of the payload, which can be a measure of a similarity of distribution of random variables;
- optionally, a hash function of the payload, which is substantially orthogonal to the entropy, since it shows high sensitivity for cases of nearly identical payloads (for example, with only a single bit changed).

The machine learning models are trained to be able to predict statistic values for parameters of future network traffic based on knowledge of its state at a given moment.

In one approach, the machine learning models can be trained to analyze individual packets to predict the timing (and possible characteristics) of the appearance of the next packet of a given type. In this case, the training sample can comprise a collection of unprocessed packets.

Time Windows

Figure 3:
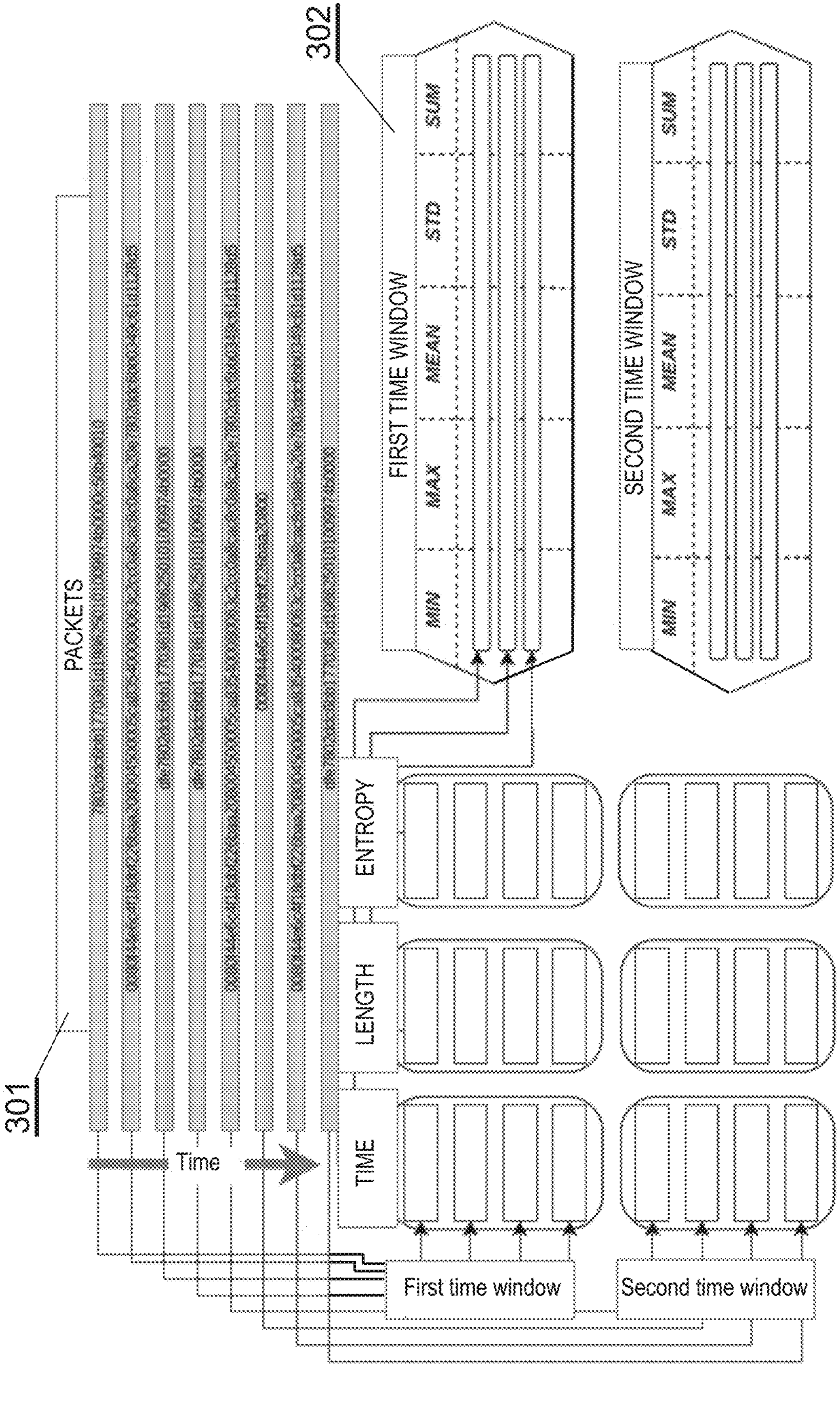
FIG. 3 depicts the division of packets into time windows and the calculation of parameter statistics.

In order to improve the training efficiency and anomaly detection results, the inventors found that it is effective to analyze data in time windows, as illustrated in FIG. 3.

The packets 301 are clustered (step 724) according to the time window 302 in which they were received. For each window, statistical values related to each parameter (such as time, payload length, entropy) of packets within the particular time window are determined (step 723), such as a minimum value, a maximum value, a mean value, a standard deviation value, a sum of values.

These statistical values are subsequently used as inputs (hyperparameters) for the machine learning models. Specifically, a dedicated machine learning model is created and assigned for each generated statistical value. Hence, if there are three parameters (such as time, payload length, entropy) and five statistical values (min, max, mean, std, sum) for a particular connection, 3*5=15 machine learning models are created, each corresponding to a particular statistical value of a particular parameter. In addition, additional (16th) machine learning model can be created to analyze the number of packets within a time window. In other words, each machine learning model 132 is dedicated to a unique statistical value for a unique parameter or a number of packets within a time window.

Alternatively, some or each of these 16 sources of data (which can be referred to as data flows) can be simultaneously input to different types of machine learning models. For example, if (as will be explained in detail below) the system can handle 6 different autoregressive machine learning model types (such as KRR, SVR, PAA, MLP, DRM, DRRM), the system may generate a total of 16*6=96 different autoregressive machine learning models.

This method facilitates easier identification of the attack vector and provides more precise information about the type of attack (anomalies in different statistics correspond to different forms of network attack). More precise information about the attack leads to quicker operator response, potentially reducing damage.

A single time window is defined by a number (in µs) that determines its duration. The length of the time window can be selected individually for each type of statistic and can be the result of an optimization procedure. The limits for optimization can be predefined. The time window length can be defined using two methods.

In the first method, known as dynamic window selection, the limiting values for window length (irrespective of the type of statistics) can be predetermined, for example, as 16 (minimum value) and 64 (maximum value) times an average length of time until the arrival of the next packet for a particular connection for the training set of packets.

In the second method, the limiting values can be predefined as specific values, such as 1000000 µs (minimum) and 5000000 µs (maximum).

The length of the time window can significantly impact the system's performance. A short window reduces the likelihood of detecting "silent" long-running attacks containing a small number of packets per unit time. Conversely, a long time window increases detection time (the system must wait to collect the data required to execute the query). The desired time window may therefore vary depending on specific scenarios and domain knowledge.

Time window optimization is based on two main steps: evaluating the quality of a given time window definition (for a given statistic) and selecting the time window definition with the highest rating.

An example will be presented for a statistic related to the average value of the parameter related to the time until the arrival of the next packet. A plurality of time window lengths are defined and for each length of the time window, the following procedure is performed.

First, an average value is calculated for the parameter for all packets within consecutive time windows. Next, a score for the particular time window length is calculated by:

- first, smoothing the distribution of the average value in all time windows, by changing values of the extreme five quantiles of the mean distribution to values of either the fifth or ninety-fifth quantile;
- next, normalizing the distribution of the average value using the min-max normalization method, which results in lower standard deviations of the variables and further reduces the influence of extreme values on the result;
- next, calculating three additional values:
  - a mean of absolute values of the differences between the average values in neighboring time windows;

- a number of unique average values, defined as a percentage of all average values;
- an entropy of a sample, defined as a complexity of a time series of the average values, to quantify the regularity and unpredictability of the time series fluctuations, using an approximate entropy technique as described in an article "A regularity statistic for medical data analysis" (by Pincus, Steven M., Igor M. Gladstone, and Richard A. Ehrenkranz in Journal of clinical monitoring 7 (1991): 335-345.)

1 finally, assigning a score to the specific time window length taking into account the following:

- if the number of unique average values is less than 5%, the particular time window is given a score of [1−max(0, n−0.5)] points, wherein n is the number of repetitions of the most frequently occurring average value divided by the number of time windows;
- if the first condition is not satisfied, the test probability (pvalue) of an extended Dickey Fuller test examining the stationarity of the process represented by the time series of average values is calculated, as described in an article "Distribution of the estimators for autoregressive time series with a unit root" (by Dickey, David A., and Wayne A. Fuller in Journal of the American statistical association 74.366a (1979): 427-431). This test examines consistency of the data with a null hypothesis assuming the existence of a unit root for the time series or an autoregressive model. If p>5%, the time window is assigned a score s calculated as:

$$s = 0.80 * (0.25 * (2 - S(\overline{x}_t)) + 0.5 * \text{unique}(\overline{x}_i^t)) + 0.20 * \left(1 - \text{mean}\left(\left|\delta\overline{x}_{i,i+1}^t\right|\right)\right)$$

wherein S is the value of the entropy of the sample, unique is the number of unique average values and mean is said mean of absolute values as discussed above.

The scoring procedure is repeated for the plurality of different values of time window lengths. The goal is to find the length of the time window within the limiting values with the highest score.

The above described procedure, if it is to be performed for each connection, for each statistic of each parameter considered and for each time window length considered, can be relatively complicated if it is to be performed based on a grid search (wherein a predefined set of uniformly distributed "networks" of parameters is tested).

This can be further optimized by using a Tree-structured Parzen Estimator Approach (TPE) algorithm, which uses so-called expected improvement criterion, and which is explained in more details in an article "Algorithms for hyper-parameter optimization" (by Bergstra, James, et al in Advances in neural information processing systems 24, 2011). In each step of the TPE optimization, the locally best value of the time window length is obtained by maximizing the above criterion. In each step of the algorithm, the criterion is improved allowing iteratively to obtain better and better values of the optimized parameter (time window length). The assumed configuration space in this case is not an n-dimensional cube as in the case of grid search, but a tree (an acyclic coherent undirected graph).

Furthermore, the calculations can be further simplified by averaging the values of statistics in the time windows. Averaging involves transforming a sequence of values in time windows into a new sequence, wherein each new value is an average of N adjacent values in the original sequence. The purpose of averaging is to smooth the distribution of values and is helpful in optimizing the model training process. Preferable values for the parameter N were found to be between 1 and 20.

Figure 4A:
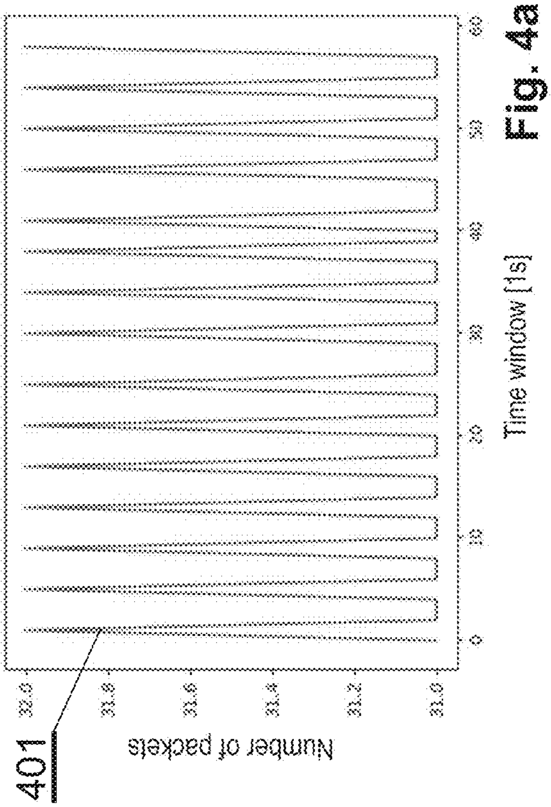
FIGS. 4*a*-4*d* display examples of statistical values for various parameters for consecutive time windows.
Figure 4B:
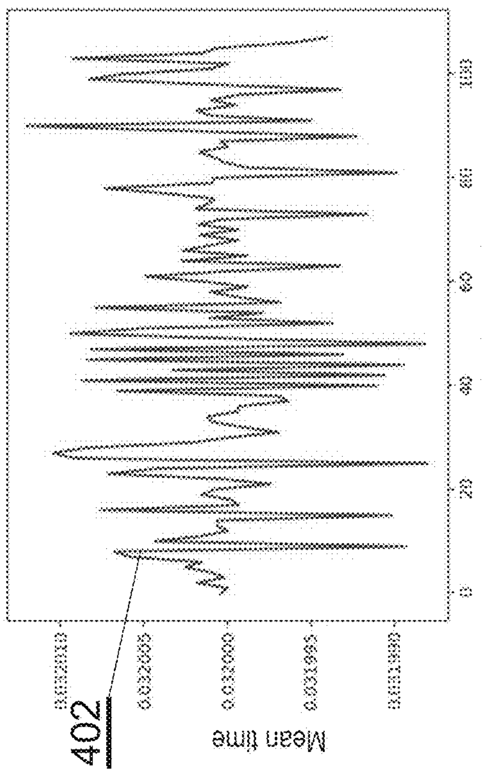
Figure 4C:
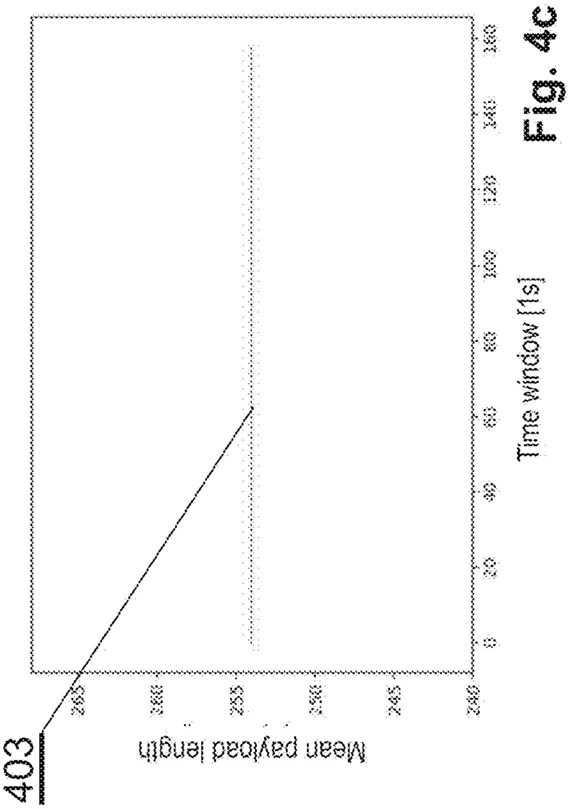
Figure 4D:
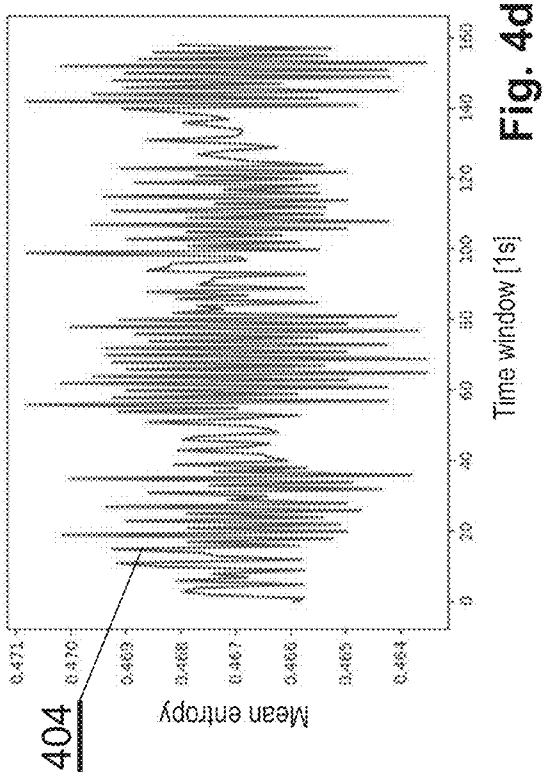

FIGS. 4*a*-4*d* show examples of pre-processed data for consecutive time windows having a length of 1 second: a plot 401 of number of packets (FIG. 4*a*), a plot 402 of mean time until arrival of a next packet (FIG. 4*b*), a plot 403 of mean payload length (FIG. 4*c*), a plot 404 of mean entropy (FIG. 4*d*).

Overview of Available Machine Learning Model(s)

The controller 131 is configured to generate and test a plurality of machine learning models 132, such as to select one or more machine learning models 132 that will be used as estimators of upcoming network traffic. If more than one model is selected, they can operate in parallel and their estimation results can be averaged to minimize the error rate.

The system can be configured to support at least two types of machine learning models 132, which can be selected depending on the type of distribution of packets (step 725):

- autoregressive machine learning models (based on time windows)—these models are most suitable when there is a visible repeating pattern in the statistical values of parameters;
- statistic machine learning models—these models are most suitable when the statistical values of parameters are random.

The best criterion for assessing the randomness of the sequence was found to be the Kolmogorov-Smirnov test. This test, in the simplest case, checks how closely a sequence of statistical values resembles a normal distribution. Alternatively, randomness can be determined using the Ljung-Box test, which checks whether there is any correlation in the sequence of statistical values.

In addition, the system can be configured to support machine learning models 132 configured to analyze individual packets, by performing deep packet inspection in order to analyze packet payload. A plurality of these models can be tested in order to select one that is most suitable for the payload of packets for a particular connection.

Autoregressive Machine Learning Models

This class of machine learning models can comprise one or more of the following models: Kernel Ridge Regression (KRR), Support Vector Regression (SVR), Passive Aggressive Algorithm (PAA), Multi-Layer Perceptron regressor (MLP), Deep Regression Model (DRM), Deep Recurrent Regression Model (DRRM).

Each available type of machine learning models is tested for at least one statistical value for at least one particular parameter in order to determine whether that model is suitable for predicting traffic data for upcoming network traffic. The models are tested on a collection of traffic data packets, which is divided, for example, at a proportion 7:3 into a training data set (70%) and a validation data set (30%). Data packets are then pre-processed by performing one or more of the following:

- assigning packets to time windows (having an optimal length determined as explained above)
- calculating a particular statistical value;
- smoothing a distribution of the values in all time windows, by changing values of the extreme one percentile of the mean distribution to values of either the first or ninety-ninth percentile;
- averaging the values of statistics in the time windows by transforming a sequence of values in time windows into a new sequence, wherein each new value is an average of N adjacent values in the original sequence;

rounding the obtained values to four significant digits;

normalizing the distribution of the average value using the min-max normalization method.

Such pre-processed data can be used as input data for the models and as reference predicted values needed to calculate a loss function. An example will be discussed below, wherein the input data comprises a series of statistical values denoted as $t_1, t_2, \ldots, t_N$, wherein N is the length of the training sample and the predicted value is denoted as y. It can be assumed that $t_{i+i}$ is a linear function of only n previous statistics $t_{i-n}, \ldots, t_i$, in other words $t_{i+1}=f(t_{i-n}, \ldots, t_i)$.

The function $f$ represents one of the available models (such as the six models listed above), and n is a parameter selected (optimized) by the configurator module. The value of n is optimized for all models and is not considered as a parameter for any model. It affects the selection of input data and is not dependent on the type of the model. The input data and the predicted values can be illustrated as shown in FIG. 5, wherein each row of the table 501 shows a single input for the trained model based on the supervised learning algorithm, wherein the values in the columns from x to $x_n$ are the features (inputs of the model). The deviation between $y^j$, and $f^j$ is the error of j-th prediction. The exact formula for the error of j-th prediction depends on the particular model.

After the input data vector is created, each model is trained and then the goodness of fit of the model is calculated as a score value. The score for each model is calculated for the validation data set using the following algorithm:

for a validation sample, the prediction from the model and an error (calculated as the difference between the true value of y and the predicted value) for each input are calculated. The minimum and maximum error are assumed to be 0 and 1;

a standard deviation for the distribution of the true value of y and a standard deviation for the predicted value are calculated;

if either of the standard deviations calculated above is less than 0.01, the scores for the model are assumed to be zero. This is due to the assumption that for small values of standard deviations, the time series is a flat line and the prediction of the model is weak. The above is based on the assumption of using min-max normalization;

if the above condition does not hold, the score is calculated as a ratio of the two standard deviations (calculated as a ratio of a higher deviation to the lower deviation, so that it is between 0 and 1) minus ten times the mean squares of the errors. Here, the model is assumed to be good if the distribution of the predicted values approximates the distribution of the true values with a small mean prediction error.

The optimization algorithm finds a combination of the value of parameter n and a particular statistical value (hyperparameter for the model) that minimize the value (actually, its minus value) of the scores. The number of optimization steps can be different for each model type, for example it can be equal to 100 for KRR, SVR, PA and MLP models, and between 1 and 16 for DRM and DRRM models. Since the efficiency of optimization is proportional to the number of steps and inversely proportional to the number of optimized hyperparameters, the best results can be achieved for the RR and MLP models (100 optimization steps for 2 optimized parameters) and the worst for the DRRM model (usually 4 optimization steps for 6 optimized parameters).

The hyperparameters found in the optimization process are filtered. It is required that each set of hyperparameters corresponds to a model with a score value above 0.9. Then, a number of sets (for example, up to 2 sets) of hyperparameters per model type (KRR, MLP, etc.), combination and statistic are stored in a database. Any two sets of hyperparameters should differ from each other by a particular value.

Statistic Machine Learning Models

The statistic machine learning modules are used for training data sets that have a normal distribution, which can be assessed as explained above using the Kolmogorov-Smirnov test or the Ljung-Box test.

Data for the statistic machine learning models is also processed by dividing them into time windows, as explained above. The statistical values should represent a stationary process within the time window, to get values for which the mean and variance do not change over time and which have a distribution that is close to normal, and wherein the individual values are independent of each other.

Various statistic machine learning models for statistical process control (SPC) can be used, and two examples will be explained in detail herein: a first model, herein called SPCxr—that is based on controlling the value of a mean and variance of a variable; and a second model, herein called SPCxs—that is based on controlling the value of the mean and a standard deviation. Assuming that the monitored processes contain a variance, it can arise for two main reasons. The first reason is the naturally occurring variance in a random variable, which creates a certain range, in the area of which the fluctuations occur. The second reason can be related to special events (such as a breakdown of a device within the network), it is undesirable and requires analysis. The main task of the statistic machine learning models is to create a range of natural variance and monitor whether the change in a given value has occurred naturally or is perhaps the result of a special event, and thus classify it as an anomaly.

Figure 6A:
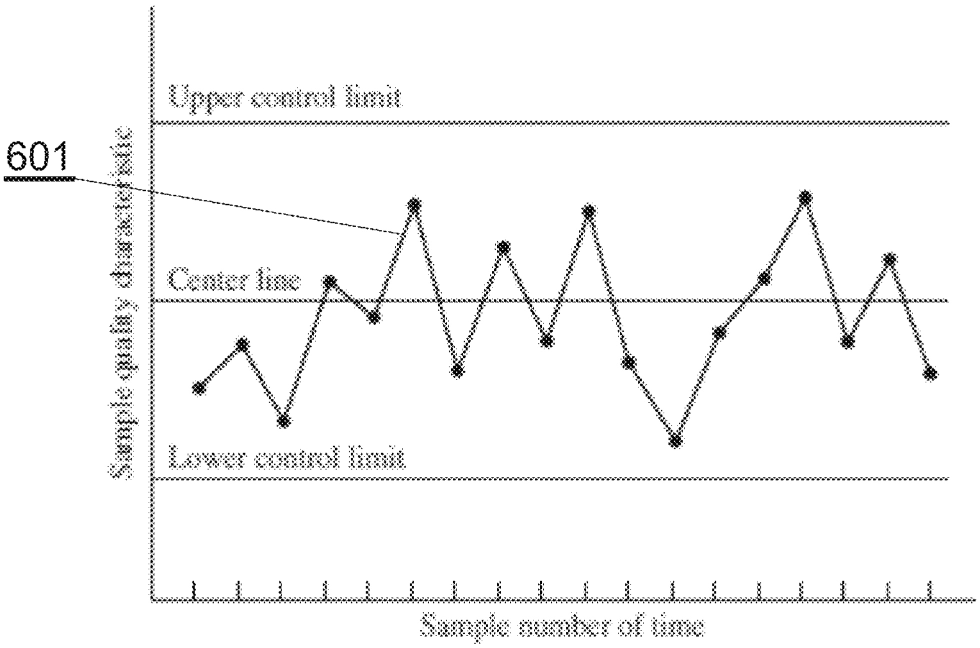
FIG. 6*a* shows UCL, central and LCL lines for a statistical machine learning model.
Figure 6B:
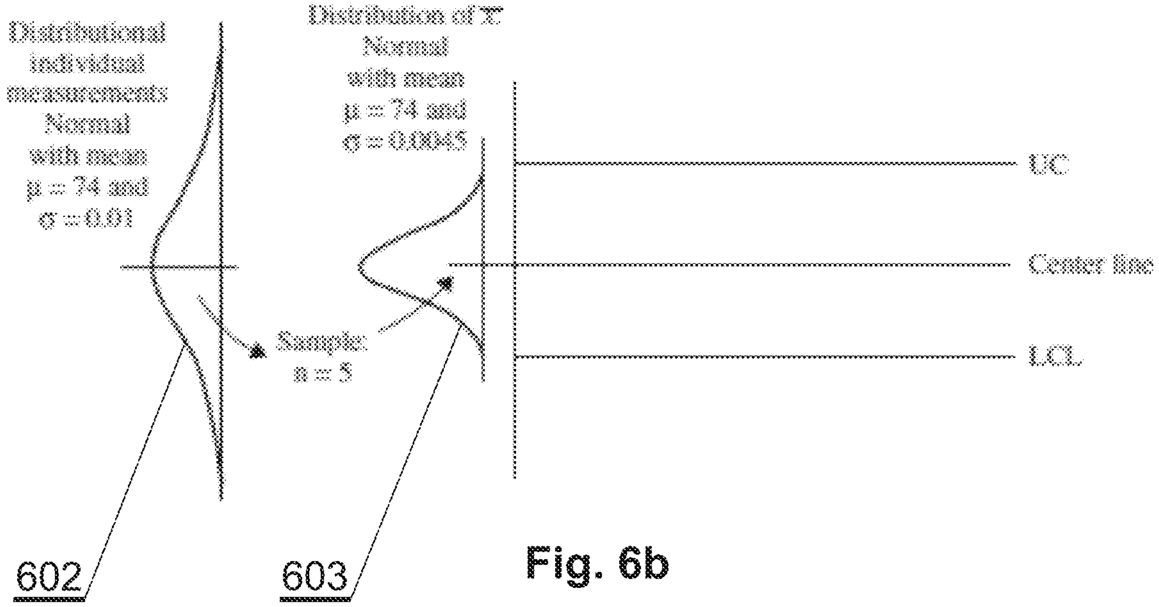
FIG. 6*b* illustrates a normalized distribution of values within the UCL, central and LCL lines.
Figure 7:
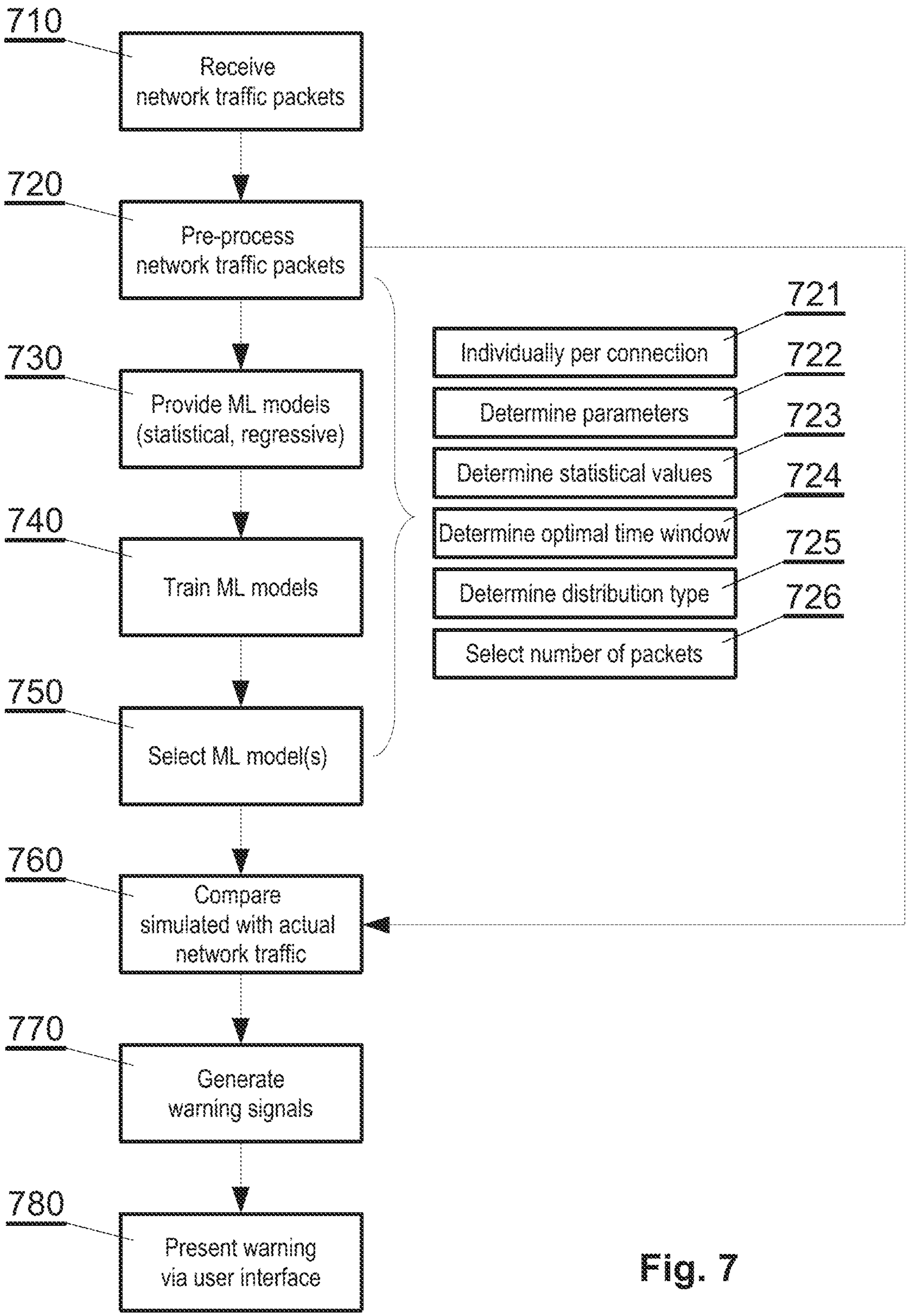
FIG. 7 illustrates a method for monitoring network traffic as performed by the system of FIG. 2.

Regardless of the statistical value (hyperparameter) that is analyzed, three important lines can be defined, as shown in a plot 601 of FIG. 6*a*, which are useful as a graphic representation of the method: a central line (defining an average value of the variable), a lower control limit (LCL) and an upper control limit (UCL). Defining the value of control limits can be formulated as determining a probability that a variable will fall into a certain distribution, usually determined by a value of 30, according to the well-known three sigma rule. Since the models are used for sets of data whose distribution was confirmed as normal (or at least close to normal) it can be assumed that ~99.7% of values will be within three intervals from the central line, wherein ~68% of values will be in the first interval and ~95% of values will be in the second interval. Values exceeding beyond the third sigma interval are therefore highly unlikely—example distributions are shown in plots 602 and 603 on FIG. 6*b*.

The statistical machine learning models can be configured to report anomalies when the controlled value exceeds a lower or an upper limit. This is the simplest and most effective approach in detecting deviations from the norm.

However, other and more sophisticated rules can also be implemented for detecting unlikely events. For example, anomalies could be reported when:

two of three consecutive measurement points are within the third sigma interval;

four of five consecutive measurement points are within the second sigma interval;

seven consecutive points are above or below the center line;

seven consecutive points rise or fall;

eight consecutive points are in the second and third sigma intervals;

sixteen consecutive points are in the first sigma interval;

twelve consecutive points have alternately rising and falling values.

Each of the available types of statistic machine learning model is tested for at least one statistical value for at least one particular parameter that has been confirmed as having a normal distribution. The models are tested on the whole a collection of traffic data packets. Data packets are then pre-processed by performing one or more of the following:

assigning packets to time windows (having an optimal length determined as explained above);

calculating a particular statistical value;

rounding the obtained values to four significant digits;

grouping the results in larger time windows based on a value of a moving average (for example, if the moving average is 6, the result is the average of $x_1, \ldots, x_6$ windows)

Next, limits are determined for each statistic machine learning model.

For the SPCxr model, three control lines are determined for the mean value (X) and three control lines are determined for the variance value (R).

The central line for the mean value (X) is determined by the equation:

$$\bar{\bar{x}} = \frac{\bar{x}_1 + \bar{x}_2 + \ldots + \bar{x}_m}{m}$$

wherein m is the number of time windows in the training set and $\bar{x}_1, \ldots, \bar{x}_m$ are mean values of the time windows.

Next, a gap R is determined for each window as a difference between the maximum value and a minimum value of statistic values within that window. An average gap for all m time windows is calculated as:

$$\bar{R} = \frac{R_1 + R_2 + \ldots + R_m}{m}$$

A standard deviation estimator can be determined as:

$$\sigma = \frac{\bar{R}}{d_2},$$

wherein $d_2$ is a predetermined constant defined as follows, depending on the value of the moving average window (m)–$d_2$(m): $d_2$(2)=1,128; $d_2$(3)=1.693; $d_2$(4)=2,059; $d_2$(5)=2,326; $d_2$(6)=2,534; $d_2$(7)=2,704; $d_2$(8)=2,847; $d_2$(9)=2,970; $d_2$(10)=3,078; $d_2$(11)=3,173; $d_2$(12)=3,258; $d_2$(13)=3,336; $d_2$(14)=3,407; $d_2$(15)=3,472; $d_2$(16)=3,532; $d_2$(17)=3,588; $d_2$(18)=3,640; $d_2$(19)=3,689; $d_2$(20)=3,735; $d_2$(21)=3,778; $d_2$(22)=3,819; $d_2$(23)=3,858; $d_2$(24)=3,895; $d_2$(25)=3,931.

Finally, the ULC, centerline and LCL values for the mean value (X) can be determined based on the following equations:

$$ULC = \bar{\bar{x}} + \frac{3\bar{R}}{d_2\sqrt{n}}$$

-continued $$\text{Centerline} = \bar{\bar{x}}$$

$$LCL = \bar{\bar{x}} - \frac{3\bar{R}}{d_2\sqrt{n}}$$

The three lines for the variance value (R) are determined in a similar way. The standard deviation estimator for the R value is calculated as:

$$\hat{\sigma}_R = d_3\frac{R}{d_2},$$

wherein $d_3$ is a predetermined constant defined as follows, depending on the value of the moving average window (m)–$d_3$(m): $d_3$(2)=0.853; $d_3$(3)=0.888; $d_3$(4)=0.880; $d_3$(5)=0.864; $d_3$(6)=0.848; $d_3$(7)=0.833; $d_3$(8)=0.820; $d_3$(9)=0.808; $d_3$(10)=0.797; $d_3$(11)=0.787; $d_3$(12)=0.778; $d_3$(13)=0.770; $d_3$(14)=0.763; $d_3$(15)=0.756; $d_3$(16)=0.750; $d_3$(17)=0.744; $d_3$(18)=0.739; $d_3$(19)=0.734; $d_3$(20)=0.729; $d_3$(21)=0.724; $d_3$(22)=0.720; $d_3$(23)=0.716; $d_3$(24)=0.712; $d_3$(25)=0.708.

Finally, the ULC, centerline and LCL values for the variance value (R) can be determined based on the following equations:

$$ULC = \bar{R} + 3d_3\frac{\bar{R}}{d_2}$$

$$\text{Centerline} = \bar{R}$$

$$LCL = \bar{R} - 3d_3\frac{\bar{R}}{d_2}$$

The SPCxs model is trained in a manner equivalent to the SPCxr model, with the exception that the estimator constant is changed. For the mean value (X) a standard deviation is calculated as:

$$\bar{s} = \frac{1}{m}\sum_{i=1}^{m} s_i$$

wherein $s_i$ is a standard deviation of i-th window. The ULC, centerline and LCL values for the mean value (X) can be determined based on the following equations:

$$ULC = \bar{\bar{x}} + \frac{3\bar{s}}{c_4\sqrt{n}}$$

$$\text{Centerline} = \bar{\bar{x}}$$

$$LCL = \bar{\bar{x}} - \frac{3\bar{s}}{c_4\sqrt{n}}$$

wherein $c_4$ is a predetermined constant defined as follows, depending on the value of the moving average window (m)–$c_4$(m): $c_4$(2)=0.7979; $c_4$(3)=0.8862; $c_4$(4)=0.9213; $c_4$(5)=0.940; $c_4$(6)=0.9515; $c_4$(7)=0.9594; $c_4$(8)=0.965; $c_4$(9)=0.9693; $c_4$(10)=0.9727; $c_4$(11)=0.9754; $c_4$(12)=0.9776; $c_4$(13)=0.9794; $c_4$(14)=0.981; $c_4$(15)=0.9823; $c_4$(16)=0.9835; $c_4$(17)=0.9845; $c_4$(18)=0.9854; $c_4$(19)=0.9862; $c_4$(20)=0.9869; $c_4$(21)=0.9876; $c_4$(22)=0.9882; $c_4$(23)=0.9887; $c_4$(24)=0.9892; $c_4$(25)=0.9896.

In turn, the ULC, centerline and LCL values for the standard deviation value(S) can be determined based on the following equations:

$$ULC = \bar{s} + 3\frac{\bar{s}}{c_4}\sqrt{1 - c_4^2}$$

$$\text{Centerline} = \bar{s}$$

$$LCL = \bar{s} - 3\frac{\bar{s}}{c_4}\sqrt{1 - c_4^2}$$

While the models are trained, no additional hyperparameters need to be selected, therefore the creation of statistical models is much faster as compared to autoregressive models, and does not require such a large amount of calculations. The SPCxr and SPCxs models are trained separately, wherein for each model appropriate limits are selected for two graphs (X, R or X, S) per model. Then each model is evaluated by assigning it a score according to the formula:

$$\text{score} = \min(1, 0.8 \times \text{precision} + 0.2 \times \text{moving average score})$$

wherein the moving average score is the value of the moving average, and the precision is the value expressed as a percentage, indicating the amount of the samples that fell within the three sigma interval. The minimum score for the model to be accepted is 0.9. Since there are no additional hyperparameters in the model itself, only one best configuration is obtained.

Final Selection of at Least One Model

Although the models selected during the hyperparameter optimization stage accurately predict network traffic, it is possible that some models perform better than others. To select the best models, they can be chosen based on the calculated model scores. The selection can be made to eliminate models that do not allow online operation, i.e., those for which the time of window analysis is longer than the time window length itself. The ratio of these times can be referred to as a "resource" of the model. A requirement can be set so that the sum of resources for the final selected models is less than a certain constant, hereinafter referred to as MAX_RESOURCES.

The selection can be made according to the solution of the Knapsack Problem, wherein score is the value of an object and resource is its volume. This can be solved as:

- reject models with resource>MAX_RESOURCES
- for each model, calculate effective score=score*(1-resource)
- as long as the sum of resources for models>MAX_RESOURCES:
  - discard models with the smallest effective score, so that there are the same number of models for each connection;
  - discard the model with the smallest effective score.

This procedure allows to obtain a set of models that substantially evenly analyze all connections and whose performance allows online analysis of packets.

Alternatively, other selection procedures are possible, such as:

- selecting the two best models according to their score for a particular connection;
- selecting the best model according to the score among the found different configurations for a particular connection, statistics and machine learning model.

While the invention has been described with respect to a limited number of embodiments, it will be appreciated that many variations, modifications and other applications of the invention can be made. Therefore, the claimed invention as recited in the claims that follow is not limited to the embodiments described herein.

The invention claimed is:

1. A computer-implemented method for monitoring network traffic, the method comprising:

receiving network traffic packets from at least one network probe;

pre-processing the network traffic packets individually for each connection, wherein a connection is identified by at least one of: a sender identifier, a recipient identifier, a communication port, and a transmission protocol, the pre-processing comprising:

determining, for each packet, at least one parameter corresponding to a time until arrival of a next packet, a payload length, or an entropy; and determining, for each parameter of a plurality of packets, at least one statistical value corresponding to a minimal value, a maximal value, a mean value, a standard deviation value, or a sum value, to generate pre-processed network traffic data in a form of a time series containing at least one statistical value for at least one parameter for the plurality of packets each network traffic data item of the time series being representative of network traffic packets (301) from a selected time window (302);

providing, for each connection, an independent set of machine learning models configured to predict network traffic data for upcoming traffic for the connection based on the pre-processed network traffic data of traffic received so far for the connection, wherein each machine learning model is dedicated to a distinct statistical value for a distinct parameter;

training the machine learning models with the pre-processed network traffic data and deriving an evaluation score for each machine learning model;

based on the evaluation score, selecting at least one machine learning model of the trained machine learning models for monitoring of upcoming network traffic;

monitoring the upcoming network traffic to detect anomalous events by comparing an actual network state with a network state simulation generated using the selected at least one machine learning model; and generating a warning signal if the actual network state does not match the generated network state simulation, wherein the actual network state is represented by a statistical value generated for actual network traffic and the network state simulation is represented by a statistical value predicted by the selected at least one machine learning model, the statistical value being for a parameter specific to a selected machine learning model.

2. The method according to claim 1, further comprising outputting the warning signal via a graphical user interface (GUI) or an application program interface (API).

3. The method according to claim 1, further comprising determining an optimal time window length from a plurality of time window lengths within predefined limits using a Tree-structured Parzen Estimator (TPE) approach.

4. The method according to claim 1, further comprising determining, using a Kolmogorov-Smirnov test or a Ljung-Box test, whether the statistical values have a standard distribution and if so, selecting at least one statistical machine learning model, and otherwise selecting at least one autoregressive machine learning model for training.

5. The method according to claim 1, further comprising including a number of packets within a time window in the pre-processed network traffic data.

6. The method according to claim 1, wherein the at least one parameter further comprises a hash function of a payload carried by a packet.

7. A network monitoring system comprising:

a data interface for receiving network traffic packets from at least one network probe;

a data pre-processor configured to pre-process the network traffic packets individually for each connection, wherein a connection is identified by at least one of: a sender identifier, a recipient identifier, a communication port, and a transmission protocol, the data pre-processor being further configured to determine, for each packet, at least one parameter corresponding to a time until arrival of a next packet, a payload length, or an entropy, and determine, for each parameter of a plurality of packets, at least one statistical value corresponding to a minimal value, a maximal value, a mean value, a standard deviation value, or a sum value, to generate pre-processed network traffic data in a form of a time series containing at least one statistical value for at least one parameter for the plurality of packets, each network traffic data item of the time series being representative of network traffic packets from a selected time window;

a configurator comprising, for each connection, an independent set of machine learning models configured to predict network traffic data for upcoming traffic for the connection based on the pre-processed network traffic data of traffic received so far for the connection, wherein each machine learning model is dedicated to a distinct statistical value for a distinct parameter, and a controller configured to:

train the machine learning models with the pre-processed network traffic data;

derive an evaluation score for each machine learning model; and based on the evaluation score, select at least one machine learning model of the trained machine learning models for monitoring of upcoming network traffic; and an anomalies detector comprising a plurality of comparators, each comparator associated with one or more selected machine learning models and configured to compare a statistical value predicted by the one or more associated machine learning models with a statistical value generated for actual network traffic by the data pre-processor, the anomalies detector being further configured to:

monitor the upcoming network traffic to detect anomalous events by comparing an actual network state with a network state simulation generated using the selected at least one machine learning model; and generate a warning signal if the actual network state does not match the generated network state simulation, wherein the actual network state is represented by a statistical value generated for actual network traffic and the network state simulation is represented by a statistical value predicted by the selected at least one machine learning model, the statistical value being for a parameter specific to a selected machine learning model.

8. The network monitoring system according to claim 7, wherein the anomalies detector is configured to output the warning signal via a graphical user interface (GUI) or an application program interface (API).

9. The network monitoring system according to claim 7, wherein the configurator is configured to determine an optimal time window length from a plurality of time window lengths within predefined limits using a Tree-structured Parzen Estimator (TPE) approach.

10. The network monitoring system according to claim 7, wherein the configurator is configured to determine, using a Kolmogorov-Smirnov test or a Ljung-Box test, whether the statistical values have a standard distribution and if so, select at least one statistical machine learning model, and otherwise select at least one autoregressive machine learning model for training.

11. The network monitoring system according to claim 7, wherein the configurator is configured to include a number of packets within a time window in the pre-processed network traffic data.

12. The network monitoring system according to claim 7, wherein the at least one parameter further comprises a hash function of a payload carried by a packet.

* * * * *